Patented Dec. 19, 1922.

1,439,500

UNITED STATES PATENT OFFICE.

GEORGE C. BAILEY, OF WOODCLIFF-ON-HUDSON, AND AUGUSTUS E. CRAVER, OF CLIFFSIDE, NEW JERSEY, ASSIGNORS TO THE BARRETT COMPANY, A CORPORATION OF NEW JERSEY.

CATALYTIC OXIDATION OF ACENAPHTHENE.

No Drawing. Application filed May 29, 1920. Serial No. 385,198.

*To all whom it may concern:*

Be it known that we, GEORGE C. BAILEY and AUGUSTUS E. CRAVER, citizens of the United States, residing at (1) Woodcliff-on-Hudson, New Jersey, and (2) Cliffside, in the counties of (1) Hudson and (2) Bergen and State of (1) New Jersey and (2) New Jersey, have invented certain new and useful Improvements in Catalytic Oxidation of Acenaphthene, of which the following is a specification.

This invention relates to the catalytic oxidation of acenaphthene and to the production of products of partial oxidation therefrom. It comprises a partial or selective oxidation of acenaphthene by oxidation, by means of an oxygen containing gas, either alone or mixed with diluents, in the presence of a catalyzer to form acenaphthene-quinone, naphthalic acid anhydride or acid, and naphthaldehydic acid, or any one or more of these products. Other products may also be formed in small amounts during the reaction. The invention is based upon the discovery that by subjecting acenaphthene to oxidation in the presence of an appropriate catalyzer and at an appropriate temperature, a selective or partial oxidation thereof takes place with the formation of an oxidation product or products short of complete combustion. We have found that under proper conditions the acenaphthene may be changed to products that are more valuable without effecting the complete combustion of a very large proportion of the material treated. The invention may be practiced by subjecting the acenaphthene in the vapor phase mixed with air or with oxygen either alone or admixed with other diluent gases, or with certain oxygen-containing gases, to a suitable temperature in the presence of certain catalyzers. Diluent gases such as carbon dioxide, nitrogen or steam, etc., may be used with the reaction mixture, if desired, to aid in controlling the reaction.

It has been found that many oxides of metals are suitable to be used as catalyzers for the purpose above mentioned. Among these may be mentioned aluminum, iron, nickel, cobalt, and the metals of the fifth and sixth groups of elements. So far, our work has indicated that vanadium oxide is somewhat more desirable as a catalyst than the oxides of the other metals enumerated.

By suitably regulating the conditions such as temperature, pressure and presence of diluents and operating with proper catalysts; the degree of oxidation can be controlled whereby the acenaphthene is oxidized in a particular manner to valuable oxidation products short of what is commonly known as complete combustion. The invention will be explained in connection with the following example which is given for illustrative purposes. It is not intended to limit the procedure to the details given as the process can be varied throughout wide limits without departing from the spirit or scope of the invention.

A mixture of acenaphthene and air in the vapor phase may be passed through tubes at a temperature of about 250° C. to 550° C., the tubes containing vanadium oxide deposited on crushed pumice, with the result that acenaphthene-quinone, naphthalic acid anhydride and acid and naphthaldehydic acid are produced. Instead of introducing oxygen as oxygen of the air, oxygen gas may be used either alone or diluted with steam or other inert gas; the proportion of oxygen to acenaphthene may be varied; the catalyzer may be deposited on the crushed pumice or other suitable powdered granulated or fibrous material, which is chemically inactive and acts merely as a mechanical distributor; the rate at which the mixture is passed through the tubes may be regulated to suit the needs; the tubes may be varied in length or diameter or confined spaces other than tubes may be used in which to place the catalyzer; instead of vanadium oxide other compounds may be used as a catalyzer. It is essential that acenaphthene in the vapor phase shall come in contact with the catalyzer in the presence of oxygen for the proper reaction to take place. The introduction of a diluent gas is a convenient way to assist in regulation of the reaction. It has been found that the pressure may be varied throughout quite wide ranges, say slightly below atmospheric up to considerably above atmospheric, with very satisfactory results.

As a further specific example it may be mentioned that when acenaphthene and air in the proportion of 1 to 6.2 by weight are passed through a tube containing vanadium oxide at 400° C. acenaphthene-quinone, naphthalic acid anhydride, naphthaldehydic acid, acenaphthylene are obtained in the ratio of 0.41 : 11.1 : 6.33 : 23.48 together with traces of maleic acid, phthalic acid and bi-acenaphthylidene-di-ketone. The separation of the various products of oxidation may be accomplished by the usual chemical procedures or by fractional condensation or other convenient methods. We have found it practicable to remove from the oxidation products the acid content of the same by trituration with sodium carbonate and the quinone can similarly be removed with a sodium bi-sulphite solution. The following are given as the structural formulas of the acenaphthene and the products formed in appreciable amounts during the oxidation reaction:

Acenaphthene

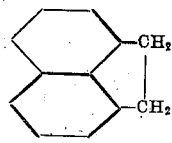

Acenaphthene-quinone

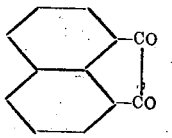

Naphthalic acid anhydride

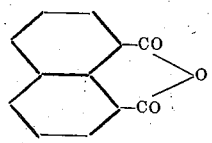

Naphthaldehydic acid

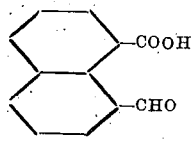

or

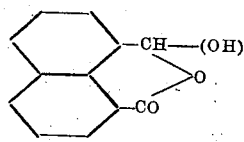

Acenaphthylene

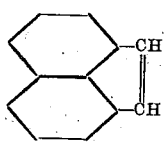

Biacenaphthylidene-diketone

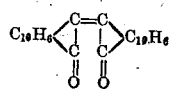

Where considerable excess of acenaphthene is used over and above that which enters into the reaction, the remaining acenaphthene will in part pass through practically unchanged, and the reaction gases will be correspondingly diluted by the excess acenaphthene present during the reaction. The reaction products can be condensed by cooling the same.

The acenaphthene used should preferably be of high purity or if admixed with impurities, it should be substantially free from impurities of such character as would prejudice the desired selective and partial catalytic oxidation.

Various types of apparatus may be used for carrying out of the present invention and for bringing about the necessary contact of the reacting gases with the catalyst, and for maintaining the proper temperature for the catalytic reaction. Accordingly, we do not deem it necessary to describe in further detail such types of apparatus.

The various conditions of the reaction are capable of variation. Among these conditions may be mentioned the temperature and pressure at which the reaction is carried out, the time of contact of the reactive gases with the catalyst, the proportion of catalyst to the reacting gases, and the relative proportions of acenaphthene and oxygen and of diluent gases such as nitrogen, steam or carbon dioxide. The reaction may thus be carried out at atmospheric pressure or at increased or diminished pressures. The oxidizing effect can be modified by further diluting the reacting gases, as by returning the air, impoverished in oxygen by the reaction, to dilute the reacting gases in the further carrying out of the process or by mixing oxygen with the air to increase the oxygen content thereof, or by using oxygen alone without other diluent, or by using oxygen in admixture with other gases than those contained in air, etc.

The time of contact of the reacting gases with the catalyst can be varied by increasing the catalytic mass or by decreasing the speed at which the reacting gases pass through or in contact with the catalyst. These and like variations will correspondingly modify and effect the catalytic oxidation.

The various conditions of the reaction speed, ratio and temperature are manifestly interdependent, e. g., if a higher catalyst temperature be employed, a faster speed of vapors or a different ratio might be used to secure desired oxidization which would take place at a lower temperature and a different ratio or speed. Similarly by lengthening the catalytic cartridge and thus securing more time of contact for the mixed vapors, a lower catalyst temperature to secure a given reaction might be employed than with a shorter cartridge. In a similar way more or less vigor of oxidation may be secured by changing one or more of the running conditions. Therefore, it is quite difficult to state definitely the optimum conditions for the best conversion of acenaphthene to a desired product, as the governing factors of operation may be so varied that a number of running conditions would achieve practically the same result, but the specific example that has already been given is sufficient to illustrate the invention.

The valuable products mentioned are apparently intermediate products of the incomplete oxidation of acenaphthene. In the operation of this process under proper conditions, there has been found to be very little complete combustion, thus indicating that practically all of the acenaphthene which is oxidized is changed to more valuable products. Any of the acenaphthene which passes through the process unchanged may be separated from the other products by sublimation, crystallization, distillation, etc., and may again be passed through the reaction zone mixed with oxygen or mixed with a sufficient supply of acenaphthene and oxygen, if desired, and more will be oxidized.

We claim:

1. The method of oxidizing acenaphthene which comprises subjecting it in the vapor phase to the action of an oxygen-containing gas at such a temperature and in the presence of a catalyst included in the oxides of metals of the fifth and sixth group of the periodic system and the oxides of aluminium, iron, nickel, and cobalt, so that partial oxidation of a methylene group attached to the naphthalene nucleus takes place and an oxygen atom is introduced into said methylene group.

2. The method of oxidizing acenaphthene which comprises subjecting it in the vapor phase to the action of an oxygen-containing gas at such a temperature and in the presence of a catalyst included in the oxides of metals of the fifth and sixth group of the periodic system and the oxides of aluminium, iron, nickel, and cobalt, so that oxygen is introduced into a methylene group that is attached to the naphthalene nucleus.

3. The method of producing acenaphthene-quinone, naphthalic acid anhydride or acid, and naphthaldehydic acid, which comprises oxidizing acenaphthene in the vapor phase with an oxygen-containing gas in the presence of a metallic oxide as a catalyst.

4. The method of producing acenaphthene-quinone, naphthalic acid anhydride or acid, and naphthaldehydic acid, which comprises oxidizing acenaphthene in the vapor phase with an oxygen-containing gas in the presence of vanadium oxide as a catalyst.

5. The method of oxidizing acenaphthene which comprises subjecting it in the vapor phase to the action of an oxygen-containing gas at a temperature from about 250° C. to 550° C. and in the presence of a catalyst included in the oxides of metals of the fifth and sixth group of the periodic system, and the oxides of aluminium, iron, nickel and cobalt, so that oxygen is introduced into a methylene group that is attached to the naphthalene nucleus.

6. The method of effecting partial oxidation of acenaphthene and naphthaldehydic acid, which comprises oxidizing acenaphthene in the vapor phase at a temperature from about 250° C. to 550° C. with an oxygen-containing gas in the presence of a metallic oxide as a catalyst.

7. The method of effecting the partial oxidation of acenaphthene and naphthaldehydic acid, which comprises oxidizing acenaphthene in the vapor phase at a temperature from about 250° C. to 550° C. with an oxygen-containing gas in the presence of vanadium oxide as a catalyst.

8. The method of producing acenaphthene-quinone, naphthalic acid anhydride or acid and naphthaldehydic acid which comprises oxidizing acenaphthene in the vapor phase with an oxygen containing gas in the presence of a metallic oxide as a catalyst, and separating the products of reaction from any unchanged acenaphthene and returning the acenaphthene for similar oxidizing treatment.

9. The method of producing acenaphthene-quinone, naphthalic acid anhydride or acid and naphthaldehydic acid which comprises oxidizing acenaphthene in the vapor phase with an oxygen containing gas in the presence of vanadium oxide as a cataylst, and separating the products of reaction from any unchanged acenaphthene and returning the acenaphthene for similar oxidizing treatment.

10. The method of oxidizing acenaphthene, which comprises passing a mixture of acenaphthene in the vapor phase and air in substantially the proportions of 1 to 6.2 by weight through a tube containing vanadium oxide at a temperature of about 400° C.

11. The method of oxidizing acenaphthene, which comprises passing a mixture of acenaphthene in the vapor phase and air in substantially the proportions of 1 to 6.2 by weight through a tube containing vanadium oxide at a temperature of about 400° C. and separating the acid content and quinone from the oxidation products.

In testimony whereof we affix our signatures.

GEORGE C. BAILEY.
AUGUSTUS E. CRAVER.